US012730894B2

(12) United States Patent
Gifre et al.

(10) Patent No.: US 12,730,894 B2
(45) Date of Patent: Sep. 8, 2026

(54) PERSONALIZATION OF A SECURE ELEMENT

(71) Applicant: GIESECKE+DEVRIENT MOBILE SECURITY GERMANY GMBH, Munich (DE)

(72) Inventors: Clara Gifre, Barcelona (ES); David Patino, Sant Vicenc dels Korts (ES); Federico Ruau, Hospitalet de Llobregat (ES); Ruben Gomez Jimenez, Palau-solità Plegamans (ES)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 70 days.

(21) Appl. No.: 18/292,420

(22) PCT Filed: Jul. 26, 2022

(86) PCT No.: PCT/EP2022/025348
§ 371 (c)(1),
(2) Date: Jan. 26, 2024

(87) PCT Pub. No.: WO2023/006245
PCT Pub. Date: Feb. 2, 2023

(65) Prior Publication Data

US 2024/0273206 A1 Aug. 15, 2024

(30) Foreign Application Priority Data

Jul. 28, 2021 (EP) .................................... 21382707

(51) Int. Cl.
*G06F 21/57* (2013.01)
*G06F 21/72* (2013.01)

(52) U.S. Cl.
CPC .............. *G06F 21/57* (2013.01); *G06F 21/72* (2013.01)

(58) Field of Classification Search
CPC ........ G06F 21/57; G06F 21/72; G06F 21/572; G06F 21/58; G06F 21/56; G06F 21/04; G06F 21/06; G06F 21/08
See application file for complete search history.

(56) References Cited

U.S. PATENT DOCUMENTS 8,639,625 B1 * 1/2014 Ginter .................... G06F 21/78 705/50
9,454,526 B1 * 9/2016 Kapoor .................. G06F 21/32
(Continued)

OTHER PUBLICATIONS

Extended European Search Report from corresponding EP Application No. 21382707.4, Nov. 23, 2021.
(Continued)

*Primary Examiner* — Stephen T Gundry
*Assistant Examiner* — Aaysh Aryal
(74) *Attorney, Agent, or Firm* — Workman Nydegger

(57) ABSTRACT

A method for personalizing a software, in particular an operating system OS, in a secure element, SE, includes the steps of loading a software image into the memory of the SE; loading a software personalization record comprising personalization data into the memory of the SE; and personalizing the loaded software image using the software personalization data. Personalization of the software image is initiated by an internal agent of the SE. Initiation personalization of the software image by the internal agent is triggered by a trigger event that is detected by the internal agent, the trigger event being unrelated to software personalization.

15 Claims, 5 Drawing Sheets

(56) References Cited

U.S. PATENT DOCUMENTS

| | | | | |
|---|---|---|---|---|
| 9,892,293 | B1 * | 2/2018 | Wade | G06F 21/86 |
| 10,069,633 | B2 | 9/2018 | Gulati et al. | |
| 10,127,409 | B1 * | 11/2018 | Wade | G06F 21/75 |
| 10,936,719 | B2 | 3/2021 | Sibert et al. | |
| 2002/0048369 | A1 * | 4/2002 | Ginter | H04L 9/3263 380/246 |
| 2010/0180029 | A1 * | 7/2010 | Fourman | G06F 16/9535 709/225 |
| 2012/0102334 | A1 * | 4/2012 | O'Loughlin | H04L 9/3252 713/189 |
| 2014/0075567 | A1 * | 3/2014 | Raleigh | H04L 41/5003 726/26 |
| 2014/0310739 | A1 * | 10/2014 | Ricci | G06F 16/951 725/75 |
| 2016/0283937 | A1 * | 9/2016 | Reese | G06Q 20/4012 |
| 2017/0308713 | A1 * | 10/2017 | Nagaratnam | H04L 9/0897 |
| 2017/0353477 | A1 * | 12/2017 | Faigon | G06F 21/6209 |
| 2018/0089434 | A1 * | 3/2018 | Sibert | H04L 63/0853 |
| 2018/0097639 | A1 * | 4/2018 | Gulati | G09C 1/00 |
| 2018/0205705 | A1 * | 7/2018 | Kupferschmied | G06F 21/554 |
| 2018/0225459 | A1 * | 8/2018 | Zarakas | G06F 21/77 |
| 2018/0276419 | A1 * | 9/2018 | Bartley | G06F 21/87 |
| 2020/0050753 | A1 * | 2/2020 | Davis | G06F 1/3246 |
| 2021/0390173 | A1 * | 12/2021 | Wang | G06F 21/84 |
| 2022/0012134 | A1 * | 1/2022 | Chatterjee | H04L 67/1097 |
| 2022/0141026 | A1 * | 5/2022 | Smith | H04L 9/3263 713/181 |

OTHER PUBLICATIONS

International Search Report from corresponding PCT Application No. PCT/EP2022/025348, Oct. 18, 2022.

* cited by examiner

PERSONALIZATION OF A SECURE ELEMENT

The present invention relates to personalization of a secure element and more particularly to personalization of a secure element outside the chip production site.

BACKGROUND OF THE INVENTION

Smart cards are widely used in a variety of systems such as mobile phones, payment cards, access cards, to provide identification, authentication, data storage and application processing.

Where the smart card contains security-critical applications and sensitive data, such as in the case of payment cards and the like, a secure element is used to store the data. A secure element is a tamper resistant element, TRE, that provides a secure memory and an execution environment in which application code and application data can be securely stored and administered. The secure element ensures that access to the data stored on the card is provided only when authorized. Such a secure element may exist in any form factor such as UICC, embedded SE, smartSD, smart microSD, eSIM, etc.

A secure element may include a collection of data, such as a firmware/an operating system, personalization data, packages, applets, applications, and the like, which are authenticated using security keys. The operating system and applications are stored within the secure element in volatile and non-volatile memory modules, and are executed in a secured processor of the secure element.

The specification Global Platform Technology Card Specification Version 2.3 describes standardized mechanisms for loading firmware (that is, use case dependent data which may contain the operating system and application data) and personalization data into a secure element. In particular, an Image Trusted Loader, ITL, or update agent, provided inside the secure element is configured to receive an operating system image, to perform security checks—particularly authentication and integrity checks—on the image, and to trigger installation of the image contents into a memory of the secure element, so as to install in the secure element an operating system.

FIG. 1 shows a schematic representation of the conventional process of loading firmware (e.g., an operating system, OS) into a secure element. The upper row shows the entities responsible for the corresponding production phase (I, II, III, IV), while the lower row shows the content of the secure element (i.e., chip) in that particular production phase. During a first production phase I at a chip production site (i.e., the chip factory), the chip manufacturer provides for a secure element to be loaded with trusted software, such as a secure operating system. At the chip production site, the trusted software is personalized with credentials 41, which are keys or certificates and which, upon personalization, are stored in a personalized software image, e.g. a personalized operating system, OS, referred to as "maxiInit" in FIG. 1. The trusted software or OS is personalized by specific commands, so called APDUs, that are sent from an external personalization device at the chip production site to the secure element. The personalized software is finally loaded inside the chip.

The chip with its personalized software is then, at a device manufacturer's site, embedded in a portable card-like device, such as an (e)UICC or (e)SIM (phase II), or can be delivered to another device manufacturer's site to be included (phase III) in an electronic end device like a smart phone, a computer, a car, a measurement equipment, etc., and finally released to the market (phase IV).

By following this conventional process, the personalized software image is loaded in the chip at the chip factory (phase I) because for security reasons the credentials including the keys and certificates have to be loaded in the certified environment during chip production. Consequently, the trusted software cannot be personalized at a site other that the chip production site, as no certified environment is established outside the chip factory.

Apart from such security issues, sites other than the chip manufacturer often cannot personalize a software present on the chip, e.g. the OS installed therein, because their production lines may not have the required infrastructure to send standard personalization commands to the chip, e.g. APDUs according to ISO 7816, to the chip.

Accordingly, there remains a need to enable loading and personalizing a trusted software into a secure element which overcomes the above-mentioned drawbacks.

SUMMARY OF THE INVENTION

The present invention addresses the above object by the subject-matter covered by the independent claims. Preferred embodiments of the invention are defined in the dependent claims.

According to a first aspect of the present invention, there is provided a method for loading and personalizing a software in a secure element, SE. The method comprises in a first step, loading a software image into a memory of the SE. In a further step, a software personalization record is loaded into the memory of the SE as well. The software personalization record comprises software personalization data that can be used to personalize the software image. In a subsequent step, an internal agent of the SE initiates personalization of the software image by the personalization data, thus instructing for providing a personalized software within the SE.

Throughout this application the term "software" refers to any trusted software to be loaded and executed in the secure element. Examples of such software include firmware, an operating system (OS), and any other use-case dependent secure applications. The expression "software image" (or "OS image") refers to a generic data format encapsulating a software version and cryptographic data to be used by the operating system or an agent of the SE, such as the internal agent according to the present invention.

The essence of the present invention lies in that the internal agent assumes the role of, and by that replaces, an external personalization device so that, according to the invention, the personalization can be initiated anytime and anywhere by an internal entity of the secure element, rather than being initiated during chip production by an external personalization device that is required to operate in a certified environment at the chip production site.

The proposed method therefore provides an efficient and secure solution for personalizing a trusted software in a secure element, independently of the process of loading of the respective software image and the corresponding personalization data into the secure element within a certified environment. As the trusted software does not anymore need to be personalized essentially at the same time when and at the same site where the personalization data is loaded, a flexible solution for loading and personalizing software at any time and at any place during the lifecycle of a secure element is provided.

The software personalization data comprised in the software personalization record comprises all secure credentials, in particular a set of cryptographic keys, that are required to personalize the software.

By loading the personalization record, including personalization data such as secure credentials, together with the software image into the secure element in the certified environment of the chip producer, it is ensured that confidential personalization data are loaded under strict safety conditions and are thus protected from unauthorized modifications.

The actual personalization is the process of tying the secure credentials, i.e. keys, certificates and further personalization data, to the software image. It is initiated through the internal agent of the secure element, rather than through an external personalization device. The certified environment becomes dispensable for the actual personalization, which therefore can be conducted at a later phase, e.g. when the secure element is embedded into a consumer device at a device manufacturing site.

This increases the flexibility and versatility of secure elements and their applications within electronic devices, while still providing the required security level for personalizing the software.

Preferably, the personalization is initiated by the internal agent if and/or when a trigger event occurs. That is, the internal agent initiates the personalization of the software image by the personalization data as soon as it detects the trigger event. Preferably, the trigger event is unrelated to software personalization and results from a predefined internal state of the security element, for example an initial reset of the SE, or from a specific command received by the SE from an external device.

By making the initiation of the personalization dependent on a trigger event unrelated to personalization, the personalization is decoupled from the conventional personalization scheme within a certified environment by an external personalization device. For instance, while conventionally personalization is initiated and instructed through one or more specific standardized personalization commands sent from an external personalization device to the secure element, the present invention suggests to initiate the personalization internally, by the internal agent, after detection of a trigger event. Regardless of whether that trigger event occurs internally or externally, the personalization is initiated and instructed internally and therefore decoupled from any external initiation, device, infrastructure, or environment.

According to some embodiments, the trigger event is a specific command received by the SE from an external device, for instance an Application Protocol Data Unit, APDU, according to ISO 7816. Such a command may be a proprietary command of the manufacturer of the SE or a command comprising proprietary information, for instance proprietary header bytes. In that way, personalization can be linked to any arbitrary command received by the SE from an external device that is unrelated to personalization.

The software is preferably personalized in a later phase following the production phase of the SE, in which a certified environment is not available. Because the personalization date, as comprised in the personalization record, has been safely loaded into the SE in a certified environment during the production phase and because personalization is initiated by an internal agent of the SE during a later phase, without any interference from outside of the SE, personalization is as secure as it was conducted during the production phase.

Upon loading, the software image and the personalization record are preferably written into a non-volatile memory of the SE. Preferably, the software image and the personalization record are both written in a predetermined area of the memory. The predetermined memory area is large enough to accommodate both the software image and the personalization record and comprises a dedicated, prespecified memory region, in which the personalization record is loaded into. The memory address of the prespecified memory region, e.g. the memory address via which the prespecified memory can be addressed, is known to the internal agent and can therefore be used with personalization commands and routines later to be executed. In this way, the personalization record and the personalization data therewithin can be identified by dereferencing the memory address.

Preferably, the software image is loaded into the memory area so that the prespecified memory region is left empty. The personalization record is then loaded into the prespecified memory region so that, in effect, the personalization record may be situated between two portions of the loaded software image. The personalization record may also be loaded into a leading or tailing region of the predetermined memory area, while it is preferred that the prespecified memory region lies within the memory segments accommodating portions of the software image. By that, the personalization record is disguised within the memory area.

According to a first preferred embodiment, the internal agent disposes the personalization commands and, therefore, personalization is initiated in that the internal agent transfers or hands over the personalization commands be executed by the processor of the SE. Such personalization commands make use of the personalization data comprise in the personalization record and stored in the prespecified memory region. The personalization command may represent or be compatible with standardized personalization commands that an external personalization device would send to the SE, if the software image was personalized in the conventional way. That is, even though personalization is initiated internally by the internal agent, it is transparent to the processor and the operating system of the SE, that software personalization commands are transferred or handed over by the internal agent, rather than received from an external personalization device.

According to a second preferred embodiment, the personalization record comprises, besides the actual personalization data, personalization commands to be executed by the processor of the SE upon personalization of the software image using the personalization data. Therefore, according to this embodiment, the personalization record disposes the personalization commands. The personalization commands make use of the personalization data stored in the prespecified memory region. They may represent or be compatible to standardized personalization commands that an external personalization device would send to the SE, if the software image was personalized in the conventional way.

According to this embodiment, the internal agent does not dispose the personalization commands itself but rather refers to the personalization commands disposed by the personalization record. Such personalization commands may represent a script or a comparable sequence of commands that is interpretable by the internal agent when initiating the personalization to the effect that the commands are finally executed by the processor. Even though personalization is initiated internally by the internal agent interpreting the sequence of personalization commands disposed in the personalization record, it is transparent to the processor and the operating system of the SE, that software personalization commands are disposed by the personalization record, rather than received from an external personalization device.

In some embodiments of the invention, the internal agent is loaded into the SE upon chip production within the certified environment at the manufacturer's site. Preferably, the internal agent is loaded into the SE together or in close coordination with the software image and/or the personalization record. By loading the personalization data comprised in the personalization record, including secure credentials, together with the internal agent into the secure element in a certified environment, it is ensured that strictly confidential personalization data are loaded under strict safety conditions and are thus protected from unauthorized modifications.

Preferably, the secure element, particularly the internal agent, authenticates the software image and/or the personalization record by verifying a digital signature, which may be associated with a manufacturer or vendor of the secure element or with a provider of an electronic device the secure element is embedded into. The secure element may also decrypt the software image and/or the personalization record using an encryption key which may be the same or another cryptographic key as that used for verifying the signature. Preferably, the predetermined memory area as a whole, comprising both the software image and the personalization record, is authenticated, verified and/or decrypted.

According to a second aspect of the present invention, there is provided a secure element (SE) comprising an internal agent, a processor and a memory being configured to conduct the method as specified above. In the memory of the secure element there is provided a memory area in which the software image to be personalized and the software personalization record comprising software personalization data is stored. The internal agent of the security element is configured to initiate personalization of the software image using the personalization data comprised in the personalization record.

As a trigger for initiating personalization of the software image, the internal agent is further configured to detect a trigger event being unrelated to the triggered software personalization. This process may involve detecting a predefined internal state of the SE, for example an initial reset of the SE, or detecting, as an external trigger event, a specific, preferably proprietary, command received by the SE from an external device of a manufacturer of the SE.

Preferably, the internal agent is configured to communicate with an operating system (OS) in order to initiate personalization of the software image.

The internal agent may comprise a memory or memory structure for storing data in preparation of or during the personalization process, such as data for authenticating the software image and/or personalization data fetched from a prespecified memory region of the secure element, where the personalization record and the personalization data has been loaded into.

In some embodiments of the invention, the internal agent of the SE is configured to fetch personalization commands disposed in a memory structure of the internal agent and hand over or transfer such commands, through the operating system, to the processor of the SE to have them executed and, by that, personalize the software image. In other embodiments of the invention, the software personalization commands are disposed in the personalization record and represent an interpretable sequence of commands or script. In such embodiments the internal agent of the SE is configured to access the personalization record and to interpret the sequence of personalization commands to the effect that the commands are finally, through the operation system of the SE, executed by the processor of the SE.

It has to be noted that all the processes, devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skills in the art upon reviewing the following detailed description of preferred embodiments and variants of the present invention in conjunction with the accompanying figures.

BRIEF DESCRIPTION OF THE DRAWINGS

Reference will now be made to the accompanying figures, in which.

DETAILED DESCRIPTION

Figure 1:
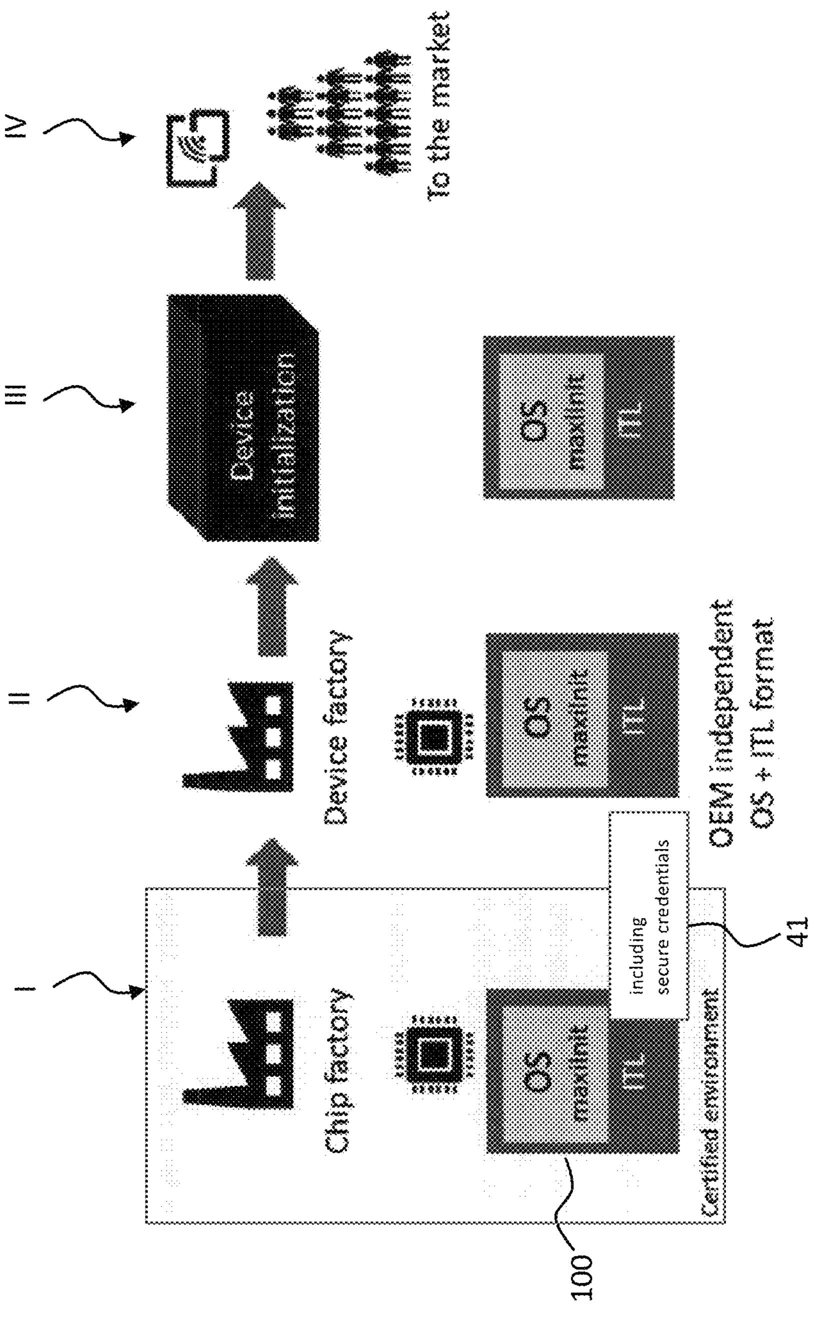
FIG. 1 shows a schematic representation of the conventional production flow of a secure element.

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
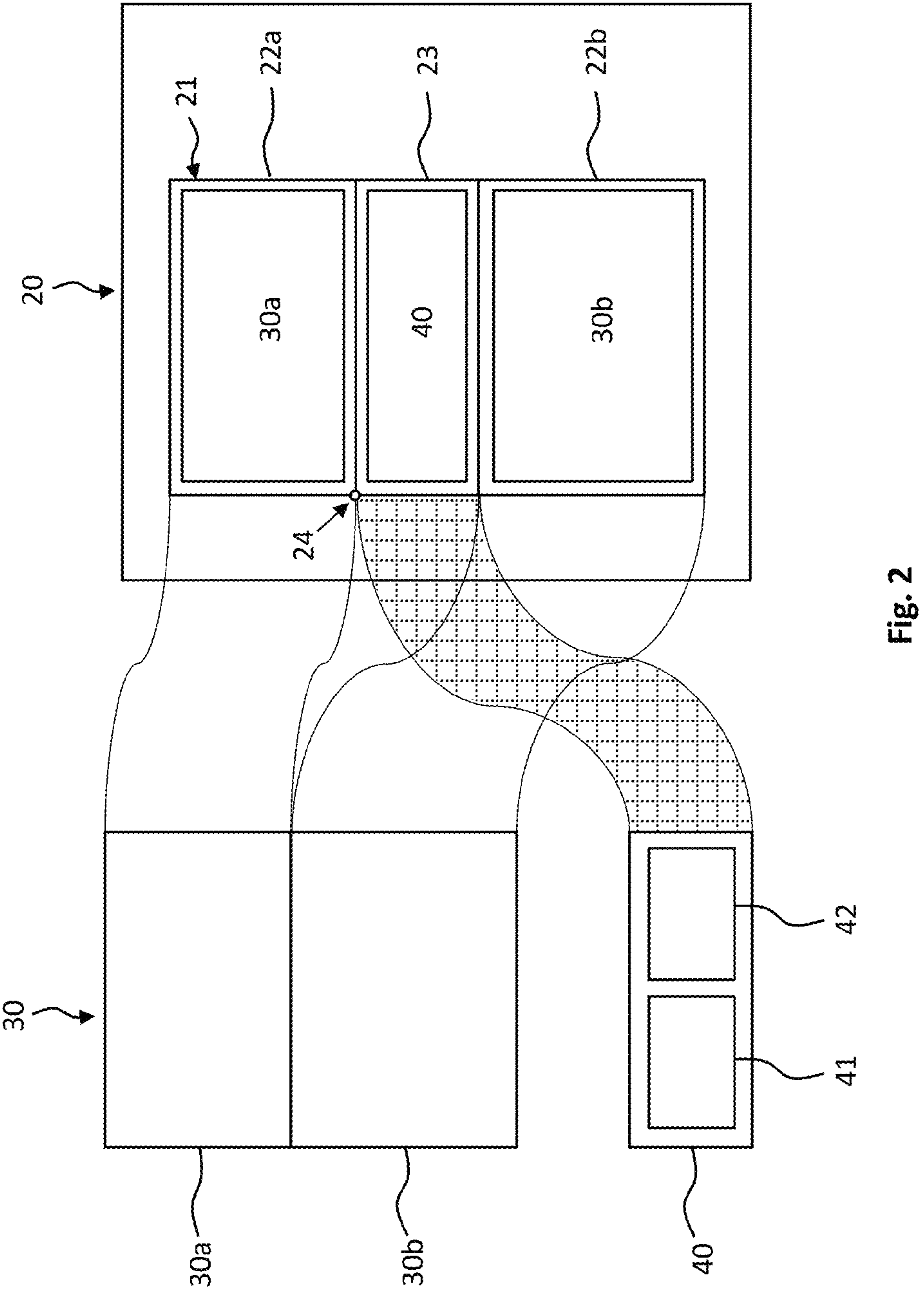
FIG. 2 shows the structure of a memory area of the secure element according to the invention.
Figure 3A:
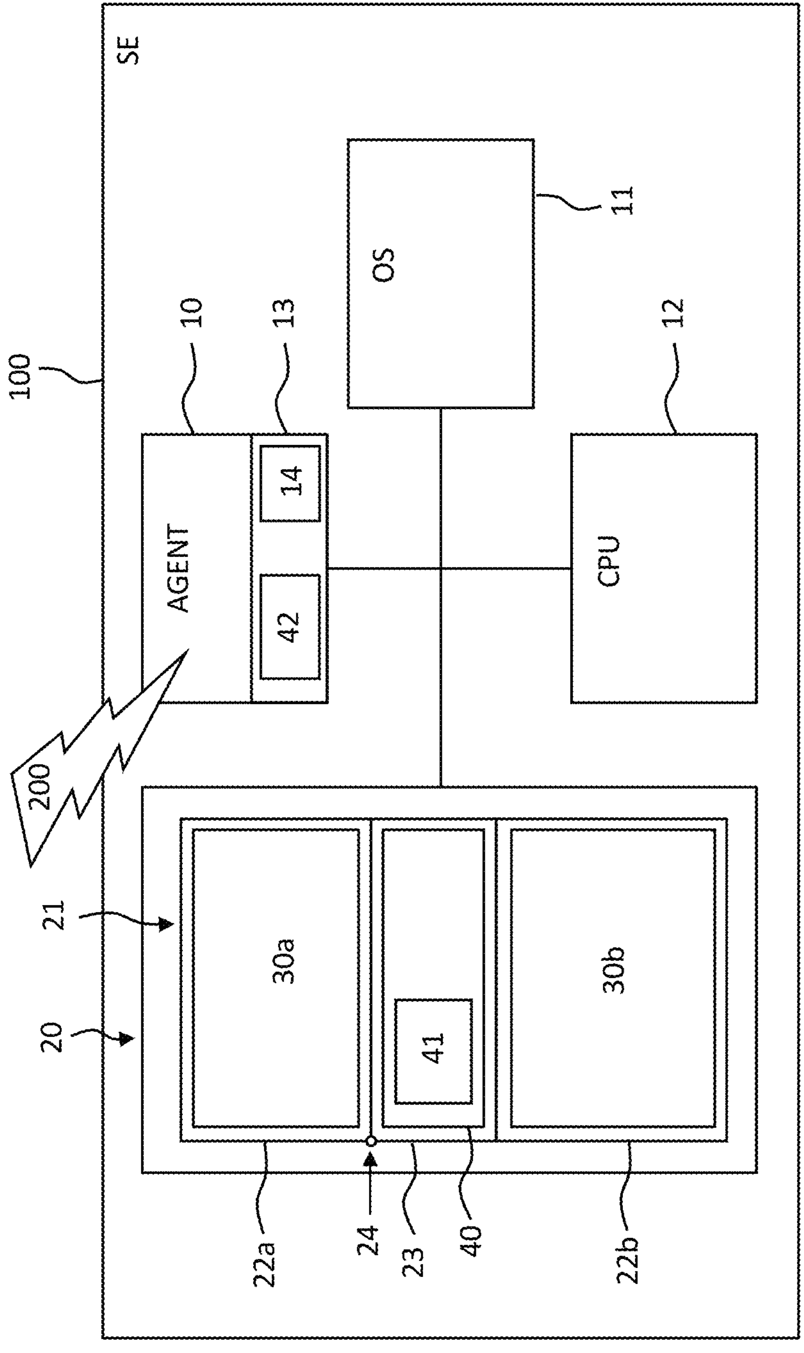
FIG. 3*a* shows the structure of a secure element according to a first preferred embodiment of the present invention.
Figure 3B:
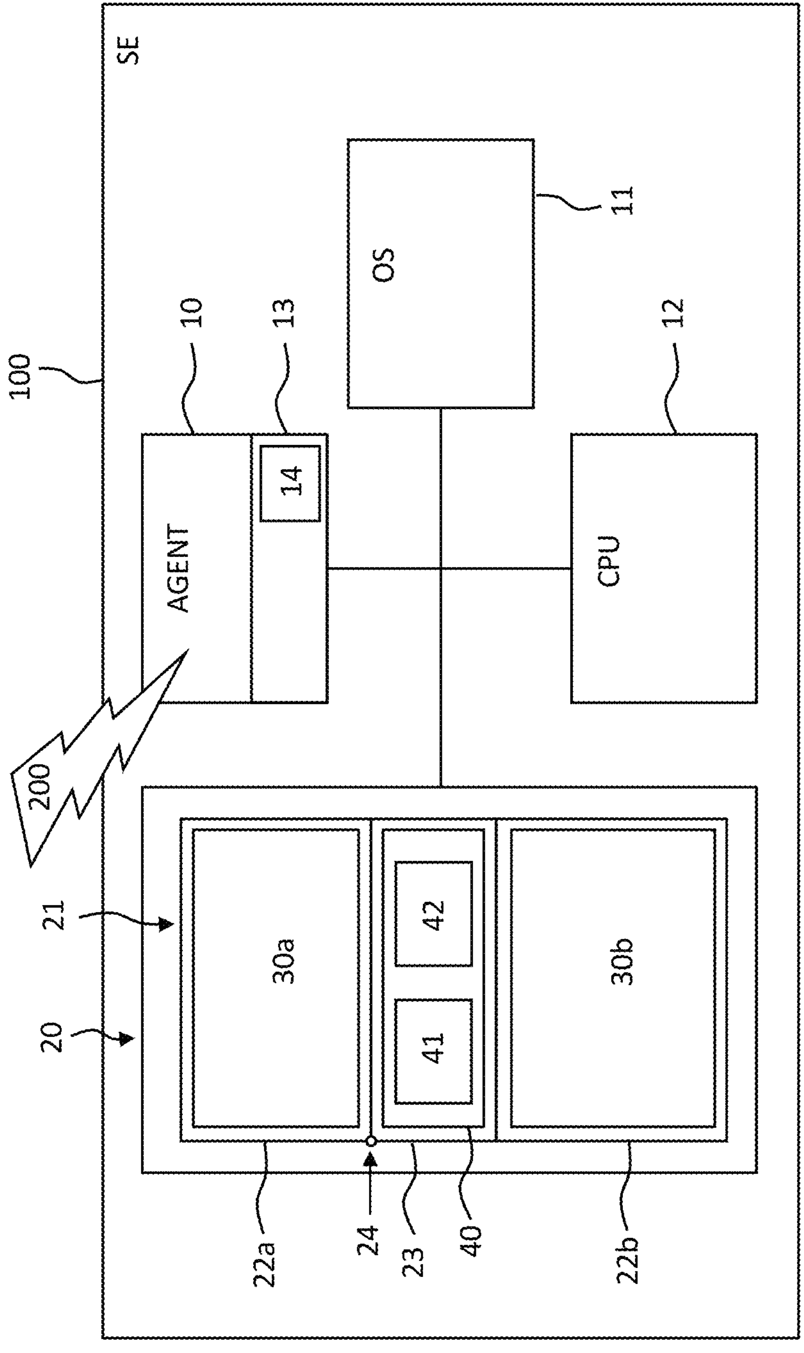
FIG. 3*b* shows the structure of a secure element according to a second preferred embodiment of the present invention.

FIG. 2 shows the structure of a memory area 21 of a secure element 100 according to the invention. FIGS. 3*a* and 3*b* show the structure of the secure element, SE, 100 according to two preferred embodiments in greater detail. In connection to FIGS. 2, 3*a*, and 3*b*, FIG. 4 shows the steps of the method according to the invention.

With reference to FIG. 2, reference numeral 21 depicts a memory area within a preferably non-volatile memory 20 of a security element, SE, 100. It comprises a prespecified memory region 23 being addressable at and starting with a memory address 24. The remaining space of the memory area 21 may form one contiguous or, preferably, two separate memory segments 22*a*, 22*b*. Preferably, memory region

23 lies in between two separate memory segments 22*a*, 22*b*. The size of the memory area 21, of memory segments 22*a*, 22*b* and particularly of memory region 23 is so determined, that a software image 30 and a personalization record 40 together fit into the memory area 21, while the personalization record 40 fits into the memory region 23.

Figure 4:
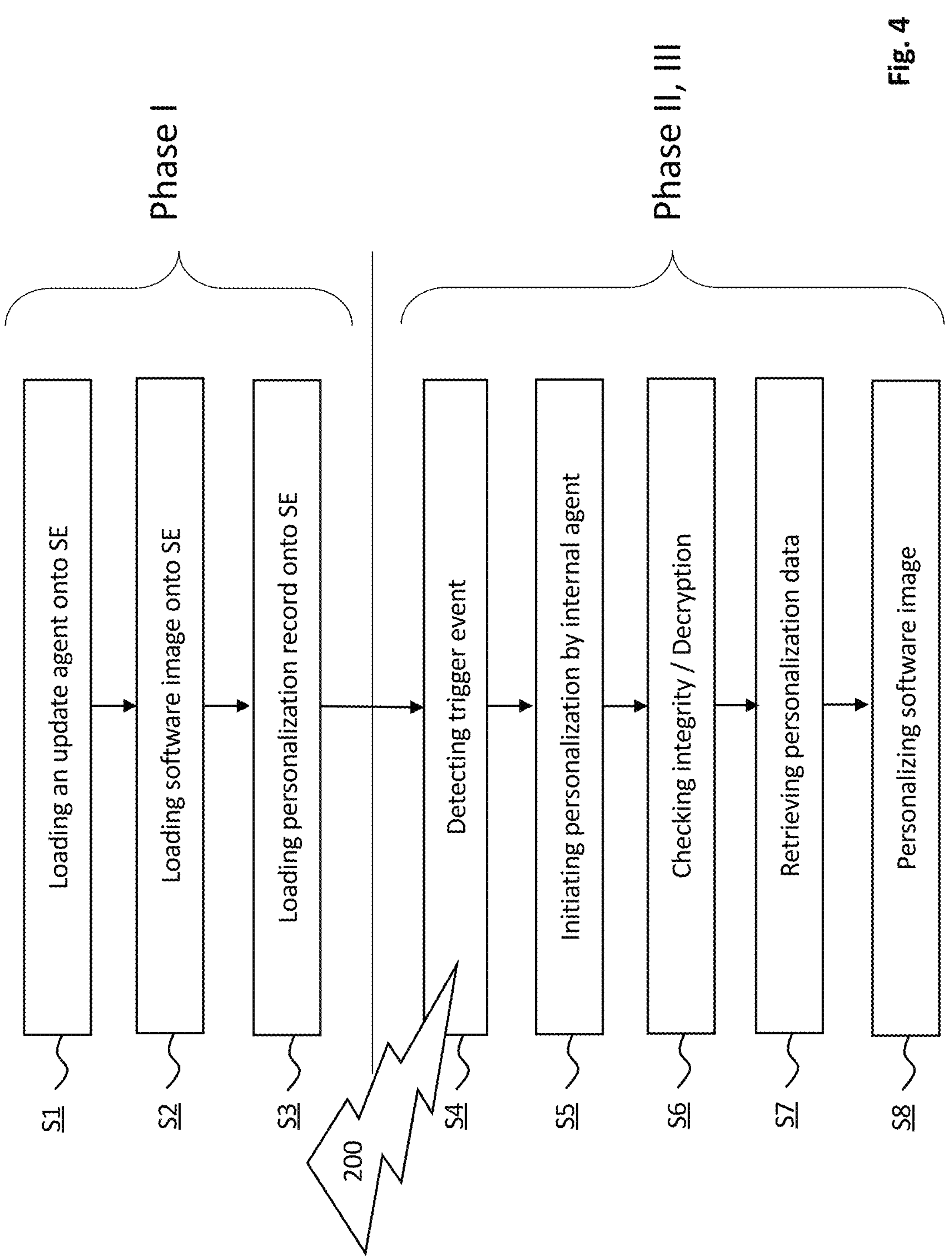
FIG. 4 shows a flow diagram illustrating a method according to the present invention.

Reference numeral 30 depicts a software image to be loaded during the production phase I of the SE 100 into memory segment 22*a*, 22*b* of memory area 21 of the SE 100 (cf. FIG. 4, step S2). Upon loading software image 30 into the memory area 21, it is split into two software image portions 30*a*, 30*b*, each of which being loaded into the respective one of the memory segments 22*a*, 22*b*. In effect, the software image 30; 30*a*, 30*b* is loaded into the memory area 21 so that the memory region 23 is left empty for the personalization record 40. Therefore, during the production phase I of the SE 100 the personalization record 40 is loaded into the memory region 23 (cf. FIG. 4, step S3) so that an internal agent 10 or an operating system 11 of the SE 100 can access the personalization record 40 at memory address 24 of the memory area 21 of the SE 100.

The personalization record 40 comprises personalization data 41 such as secure credentials and/or cryptographic keys to be later used for personalizing the software image 30. According to a preferred embodiment, the personalization record 40 may comprise personalization commands 42. An embodiment with the personalization record 40 comprising both personalization data 41 and personalization commands 42 is described below in connection to FIG. 3*b*. An embodiment with the personalization record 40 comprising personalization data 41 but no personalization commands 42 is described below in connection to FIG. 3*a*.

The process of loading the software image 30 and the personalization record 40 is performed during production phase I in a certified environment (cf. FIG. 1). The software image 30 can be securely personalized using the personalization record 40 and the personalization data 41 comprised therein in a later phase II or III. Preferably, throughout the lifetime of the SE 100, the personalization data 41 are securely stored in the SE 100 and can be securely retrieved by the internal agent 10, if required. This facilitates personalizing a software image 30 outside of the certified environment of a chip factory. More flexibility to the SE production and deployment is thus conferred.

The SE 100 shown in FIGS. 3*a* and 3*b* is a tamper resistant element, containing an internal agent 10, an operating system, OS, 11, and a processor, CPU, 12. Both the internal agent 10 and the OS 11 may be stored in a memory of the SE, such as the non-volatile memory 20. The OS 11 and the internal agent 10 are independent entities that can communicate with each other over an appropriate interface, for instance over an Application Programming Interface, API. Memory 20 is a non-volatile memory of the SE 100 that comprises a memory area 21 structured as described above in connection to FIG. 2.

The internal agent 10 may be part of or realized as a functionality of the operating system 11 or a loader entity allowing the provisioning of software (such as, for instance, use case dependent firmware) within the SE 100. Such loader entities are usually referred to as an update agent in the art. Update agents are the main entities in charge of loading software into the secure element as well as any other procedure related to it (e.g., update, restore, rollback). It is loaded onto the SE 100 during factory production (FIG. 1, phase I). The internal agent 10, regardless of whether it is realized as an independent entity or as functional part of an update agent or the operating system, is also loaded onto the SE 100 during factory production (cf. FIG. 4, step S1), because it reflects a security critical entity of the SE 100.

The internal agent 10 may contain a memory structure 13, to store sensible data thereon, for instance authentication data 14, which is used to authenticate and/or decrypt the software image 30; 30*a*, 30*b* (cf. FIG. 4, step S6) before it is personalized. At some point of the personalization process, the memory structure 13 of the internal agent 10 may contain personalization data 41 and the operating system 11 may have access to at least part of the memory structure 13 to enable personalization of the software image 30 at a later phase of the manufacturing process.

The main difference of the two embodiments described in greater detail is that according to FIG. 3*a*, personalization commands 42 are stored in the memory structure 13 of the internal agent 10, while according to FIG. 3*b*, personalization command 42 are stored in the memory region 23 as part of the personalization record 40. Regardless of where personalization commands 42 are stored, the internal agent 10 assumes the role of an external personalization device in both embodiments, that is, the internal agent 10 provides the functionality required to replace or make redundant an external personalization device. Rather than being initiated during chip production by an external an external personalization device, personalization of the software image 30 can, according to the invention, be initiated practically anytime and anywhere by the internal agent 10 (cf. FIG. 4, step S5), thus making obsolete the conventional requirement to perform personalization within a certified environment at the chip production site.

In the embodiments according to FIG. 3*a*, after the internal agent 10 detects a trigger event 200 (FIG. 4, step S4) signaling that the software image 30; 30*a*, 30*b* is to be personalized using the personalization data 41, the internal agent 10 initiates personalization (FIG. 4, step S5) by handing over or transferring personalization commands to the operating system 11 and/or the processor 12 to be executed. Upon execution of the personalization commands 42, the software image 30; 30*a*, 30*b* is accessed in memory areas 22*a*, 22*b* and the personalization data 41 is accessed in memory region 23 (FIG. 4, step S7). Because personalization commands 42 represent or are compatible to standardized personalization commands that conventionally are sent from an external personalization device to the SE 100, the process of handing over or transferring personalization commands 42 from the internal agent 10 to the OS 11 and/or CPU 12 (FIG. 4, step S8) can be regarded as an "internal send" procedure replacing the conventional "external send" procedure otherwise initiated by an external personalization device.

In the embodiments according to FIG. 3*b*, after the internal agent 10 detects a trigger event 200 (FIG. 4, step S4), the internal agent 10 initiates personalization (FIG. 4, step S5) by accessing the sequence of personalization commands 42 stored in the prespecified memory region 23. By that, the personalization commands 42 are interpreted in a way comparable to script/interpreter language environments and an internal send procedure is conducted that replaces the conventional external send procedure otherwise initiated by an external personalization device. By that, personalization commands 42 are executed by the operating system 11 and/or the processor 12 in the course of which process the software image 30*a*, 30*b* is accessed in the memory segments 22*a*, 22*b* and personalization data 41 is accessed in the memory region 23 (FIG. 4, step S7). The personalization commands 42 stored in the specific memory region 23 represent or are compatible to standardized personalization commands that conventionally are sent from an external personalization device to the SE 100.

That is, the internal send procedures described in connection with both FIGS. 3*a* and 3*b* are conducted and controlled by the internal agent 100 and have the effect that the SE 100 processes personalization commands 42 (FIG. 4, step S8) without contribution of an external personalization device. The personalization data 41 and the software image 30; 30*a*, 30*b* are nevertheless protected against tampering because they are loaded into the memory area 21 within the certified environment of the chip production site (FIG. 4, steps S2, S3) and only accessed by the OS 11 and/or CPU 12 upon personalization (FIG. 4, steps S7, S8).

The main effect of the embodiments according to FIGS. 3*a* and 3*b* is that, instead of being personalized by an external personalization device sending personalization commands through one of the interfaces supported by the SE 100, personalization data 41 is, in the form of a personalization record 40, loaded together with the software image 30 into a memory area 21 (cf. FIG. 4, steps S2, S3) predetermined for the purpose of the present invention during chip production. Therefore, personalization is decoupled from chip production and can be initiated internally in a later phase of the SE's life cycle, and conducted by the above-described internal sent procedure upon detection of a trigger event 200.

Further, instead of having personalization commands sent from a conventional personalization device to the SE 100, personalization commands are either, in the form of a personalization record 40, loaded together with the personalization data 41 into the prespecified memory region 23 (FIG. 3*a*) or are loaded into the SE 100 as a part of the internal agent stored in the memory structure 13 (FIG. 3*b*). Either way, because the personalization command 42 are provided inside the SE 100, the internal sent process consumes the internally provide personalization commands 42 (FIG. 4, step S8), retrieved one by one from the memory region 23 or the memory structure 13.

The personalization process described above is initiated by the internal agent 10 if and when (as soon as) the internal agent 10 detects a trigger event 200. Because the present invention decouples personalization from the conventional interaction with an external personalization device, the trigger event 200 replaces the initial addressing of the SE 100 by an external personalization device according to a conventional personalization scheme. Preferably, the trigger event 200 is independent of and/or unrelated to the process of personalization.

The trigger event 200 can, for instance, be an APDU command received by the SE 100 that comprises specific, possibly proprietary header bytes, such as the CLA byte or INS byte according to ISO/IEC 7816. By using proprietary bytes as trigger events 200 that are detected by a (proprietary) internal agent 10, the respective chip manufacturer remains in control of initializing personalization in a similar way as upon conventional personalization.

Apart from specifically adapted APDU commands, internal events can also be used and detected as trigger events 200. For example, the initial reset of the SE 100 at the site of device manufacturer (FIG. 1, phase II) or another internal state the SE 100 can/will assume during its early life cycle are also appropriate to decouple personalization from the production phase I and to securely conduct personalization at a later phase II or III.

FIG. 4 shows a flow chart of the main steps of a method for personalizing a software image 30, for instance an operating system, OS, in a secure element 100. The respective steps have been referred to above in detail in connection to FIGS. 2, 3*a*, and 3*b*. The method according to the present invention, as described in the following, is not restricted to any particular type of software or software image. In fact, any secure software or software image that can be executed on a secure element 100 can be subject to the personalization method as disclosed herein, for example a firmware or OS of the SE 100 or an applet/application.

With reference to FIG. 4, in a first step S1, an internal agent 10 is loaded onto the secure element SE 100. In a step S2, a software image 30; 30*a*, 30*b* is loaded into a memory area 21 of the SE, particularly into memory segments 22*a*, 22*b* of the memory 20 of the SE 100. In a step S3, a software personalization record 40 containing software personalization data 41 is loaded into a memory region 23 of the memory 20 of the SE 100. Particularly the software image 30 and the personalization record 40 may be loaded in an encrypted form and require later decryption, e.g. by the internal agent 10 in step S6. Steps S1, S2 and S3 can be performed sequentially, that is, by means of two load commands (e.g., APDU commands), or in one or two step, e.g. in that the internal agent 10 is loaded together with the personalization record 40 and the software image 30 is loaded separately onto the SE 100. Generally, steps S1, S2, and S3 can be performed in any arbitrary order, while it only is important that all three steps are performed within a certified environment during the factory production phase of the secure element. With reference to FIG. 1, this phase is identified as phase I.

The software image 30 and the personalization record 40 are thus securely loaded and stored in the SE 100 and protected from unauthorized modifications. Thus, by the end of phase I, personalization data 41, that is, secure credentials, are being securely loaded into the tamper resistant SE 100, but they have not been tied to a specific software image 30 yet.

Personalization commands 42 are either loaded in step S1 and stored within the memory structure 13 of the internal agent 10 (cf. FIG. 3*b*), or in step S3 comprised within the personalization record 40 (FIG. 3*a*). The specific memory address 24, by which the personalization record 40 can be addressed within memory region 23, is also stored within the memory structure 13 of the internal agent 10 and thus loaded into the SE 100 in step S1. Generally, the memory area 21 of the SE 100, comprising memory segments 22*a*, 22*b* and the prespecified memory region 23, may be proprietary to the respective chip manufacturer. That is, memory segments 22*a*, 22*b* and region 23, in which the software image portions 30*a*, 30*b*, and personalization record 24 are written into in the course of steps S2 and S3, respectively, are determined by the chip manufacturer and coded in the internal agent 10 for accessing memory segments 22*a*, 22*b* and region 23 upon personalization in steps S5 to S8.

In a subsequent manufacturing phase comprising steps S4 to S8, e.g. when the chip is embedded into a device (FIG. 1; phase II) or the device is initialized (FIG. 1; phase III), the software image 30 is personalized outside of the certified environment of the chip factory, for instance at a device factory where the SE 100 is embedded.

The internal agent 10 has an event handling capability so that a trigger event 200 is detected in step S4 as soon as it occurs, triggering the initiation of the personalization by the internal agent 10 in step S5 as detailed above. Then, in step S6, the protected software image 30; 30*a*, 30*b* and/or the personalization record are decrypted by cryptographic keys 14 stored in the memory structure 13 and their integrity is checked to ensure that the software image 30; 30*a*, 30*b* and the personalization record 40 have not been tampered with.

In a step S7, the internal agent 10 accesses the personalization record 40 via memory address 24 and retrieves personalization data 41 and, if applicable, personalization commands 42, and stores the same in its memory structure 13. Finally, in a step S8, the software image 30; 30*a*, 30*b* is personalized by an internal sent procedure as described above in connection to FIGS. 3*a*, 3*b*. At the end of this process, the software image 30; 30*a*, 30*b* has been personalized by personalization data 41. In case the software image 30 is an operating system 11 of the SE 100, the personalized software image is referred to in FIG. 1 as "MaxiInit". This means that it contains the operative system plus its specific personalization/configuration, including credentials.

The methods and apparatus as described through the embodiments above, provides an efficient and secure solution for personalizing a trusted software image outside of the certified environment of a chip manufacturer's site. As the software image can be personalized at a later phase and outside the chip manufacturer's environment, a flexible solution for personalizing software at any time during the lifecycle of a secure element is provided.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for personalizing a software in a secure element SE, the method comprising:

loading a software image into the memory of the SE;

loading a software personalization record into the memory of the SE, wherein the personalization record comprises software personalization data; and personalizing the loaded software image using the software personalization data;

wherein personalizing the software image is initiated by an internal agent of the SE;

wherein initiating the personalization of the software image by the internal agent is triggered by a trigger event that is detected by the internal agent, the trigger event being unrelated to software personalization and independent of both said loading the software image into the memory of the SE and said loading the software personalization record into the memory of the SE.

2. The method according to claim 1, wherein a predefined internal state of the SE, such as an initial reset of the SE, or a specific command received by the SE from an external device is detected as trigger event, wherein the specific command is a command proprietary to a manufacturer of the SE or a command comprising a proprietary portion such as proprietary header bytes.

3. The method according to claim 1, wherein the software personalization data and the software image are loaded into the SE during a production phase of the SE and the loaded software image is personalized in a subsequent phase after a production phase of the SE.

4. The method according to claim 1, wherein, upon loading the software image, the software image is written into an area of the memory of the SE with a prespecified memory region within the memory area being left empty; and upon loading the software personalization record, the software personalization record is written into the prespecified memory region.

5. The method according to claim 4, wherein the software image comprises a first software image portion and a second software image portion, wherein the first portion is written into a first memory segment of the memory area and the second portion is written into a second memory segment of the memory area, wherein the first memory segment and the second memory segment are so arranged within the memory area that the memory region is enclosed by the first memory segment and the second memory segment.

6. The method according to claim 1, wherein the software personalization record loaded into the memory of the SE comprises software personalization data, including secure credentials and/or cryptographic keys.

7. The method according to claim 6, wherein personalizing the software image is initiated in that the internal agent hands over software personalization commands to a processor of the SE, wherein the software image is personalized using the personalization data by having the software personalization commands executed by the processor.

8. The method according to claim 7, wherein the process of handing over software personalization commands or the process of interpreting software personalization commands to be executed by the processor is arranged so that it is transparent to the processor, that receipt of the software personalization commands is initiated by the internal agent, rather than by an external personalization device.

9. The method according to claim 6, wherein the software personalization record loaded into the memory of the SE comprises software personalization commands executable by a processor of the SE.

10. The method according to claim 9, wherein personalizing the software image is initiated in that the internal agent interprets the software personalization commands so that the software image is personalized using the personalization data by having the software personalization commands executed by the processor.

11. The method according to claim 1, wherein the internal agent is loaded into the SE together with the software image and/or the software personalization record, during a production phase of the SE.

12. The method according to claim 1, wherein the internal agent performs an integrity check of and/or decrypt the software personalization record and/or the software image to ensure authenticity of the software personalization record and/or of the software image.

13. A secure element, SE, comprising a processor and a memory in which a software image and a software personalization record is stored, the personalization record comprising software personalization data, wherein an internal agent of the security element being configured to initiate personalization of the software image using the software personalization data, wherein initiating the personalization of the software image by the internal agent is triggered by a trigger event that is detected by the internal agent, the trigger event being unrelated to software personalization and independent of both loading the software image into the memory of the SE and loading the software personalization record into the memory of the SE.

14. A secure element according to claim 13, wherein the internal agent is configured:

to detect a trigger event and to initiate personalization of the software image upon detecting the trigger event, the trigger event being unrelated to software personalization, wherein the internal agent is further configured to detect a predefined internal state of the SE, such as an initial reset of the SE, or a specific command received by the SE from an external device as the trigger event, wherein the specific command is a command proprietary to a manufacturer of the SE or a command comprising a proprietary portion such as proprietary header bytes; and/or to hand over software personalization commands to the processor or to interpret software personalization commands being comprised in the software personalization record to have them executed by the processor, wherein, upon executing the software personalization commands by the processor, the software image is personalized using the personalization data, so that it is transparent to the processor, that receipt of the software personalization commands is initiated by the internal agent, rather than by an external personalization device.

15. A security element SE according to claim 13, wherein the internal agent is configured to conduct a method for personalizing a software in the SE, the method comprising:

loading the software image into the memory of the SE;

loading the software personalization record into the memory of the SE, wherein the personalization record comprises the software personalization data; and personalizing the loaded software image using the software personalization data;

wherein personalizing the software image is initiated by the internal agent of the SE.

* * * * *